3,523,073
SOLVENT DEWAXING OR DEOILING PROCESS
Hallard C. Moyer, Homewood, Ill., assignor to Sinclair Research, Inc., New York, N.Y., a corporation of Delaware
No Drawing. Filed July 5, 1968, Ser. No. 742,511
Int. Cl. C10g 43/06, 43/08
U.S. Cl. 208—33                                        10 Claims

ABSTRACT OF THE DISCLOSURE

The present invention provides an improved solvent treating process for separating wax and petroleum oil through treatment with a wax-precipitating solvent. The operation involves providing as a dispersed liquid in the wax-petroleum oil mixture, a dewaxing solvent and small amounts, sufficient to facilitate separation of oil and wax, of a normally solid polyethylene and a wax alkylated naphthalene. The mixture is chilled and passed to a filter whereby solid wax is separated from the oil. The procedure can be employed in either dewaxing or deoiling systems.

---

The present invention relates to an improved solvent treating process for separating a mixture of petroleum oil and wax. More particularly, this invention is directed to an improved process for solvent dewaxing or solvent deoiling a mixture of wax and petroleum oil.

The separation of wax and petroleum oil constitutes a major processing step in the production of petroleum waxes and, in most cases, in the production of lubricating oils as well. Consequently, the efficiency of this separation, as measured by processing rates and by completeness of the separation, is of considerable importance to petroleum refiners, and methods for improving this efficiency are constantly sought.

The separation of wax from petroleum oil is most often accomplished by dissolving the waxy oil in a suitable solvent and crystallizing a "slack wax" from solution by cooling. The slack wax fraction is removed from the dewaxed oil by filtration or centrifugation, most commonly by a rotary vacuum filter where the wax is retained on the filter medium, washed with extra solvent to flush through entrained oil, and removed by mechanical scraping. Various solvents or solvent combinations can be used. The preferred solvents usually contain a ketone to promote wax precipitation at low temperatures, and often contain another solvent to promote retention of the oil in solution.

Generally, the process of solvent dewaxing petroleum oils by low temperature precipitation of wax from a solution of oil in a dewaxing solvent, for instance, composed of one or more hydrocarbons and one or more ketones, is widely used in the petroleum industry. The wax-bearing oils are mixed with the dewaxing solvent at a sufficiently high temperature to insure mutual solution and the mixture is then cooled to a sufficiently low temperature to precipitate a wax phase. The cooling temperature is normally about 20 to −15° F. or below, more commonly about −5 to −15° F. The wax phase is then removed by filtering or centrifuging the mixture and the oil and wax products separately recovered by distilling off the volatile solvent. The wax yield, that is, the wax separated from the wax-bearing oils, often varies anywhere from about 5 to 50 volume percent of the mixture but is more commonly found to be about 10 to 30 volume percent.

Likewise, solvent deoiling of oil-containing petroleum waxes is commonly conducted by a like method utilizing the solvents generally employed in solvent dewaxing. Oil-bearing waxes are blended with the solvent at a sufficiently high temperature to insure mutual solution and the mixture is cooled to a temperature less than about 100° F., for example, about 0 to 100° F., more commonly about 15 to 60° F., to precipitate the wax phase. The wax phase is then removed by filtering or centrifuging the mixture and recovered by distilling off the volatile solvent. At least 25 volume percent of oil and oily wax is generally separated in a deoiling process and more commonly about 40 to 60 volume percent of oil or oil and wax is separated. The exact percentage of oil and oily wax separated is largely dependent on the hardness desired of the wax component.

The ketones ordinarily employed in the solvent are selected from a large class of wax precipitates, such as the lower dialkyl ketones, e.g. acetone, diethyl ketone, methylethyl ketone, methylpropyl ketone, methylisobutyl ketone, dipropyl ketone, and the like. The low boiling hydrocarbon, which acts as an oil solvent and boils at a temperature lower than the oil, is usually an aliphatic hydrocarbon such as hexane, or an aromatic hydrocarbon, such as benzene or toluene or a mixture thereof. These solvents and wax precipitants are more volatile than the oil to permit ready separation of the solvent by distillation. The optimum ratio of ketone to hydrocarbon solvent and the total amount of these materials employed can vary according to the hydrocarbon solvent and ketone used, the characteristics of the oil wax treated and the amount of wax present in the mixture. The common volume ratio of ketone to hydrocarbon solvent is from 1:0 to about 1:2, preferably about 3:2 to 2:3 by volume. The volume ratio of total ketone and hydrocarbon solvent is waxy oil is generally in the range of about 1:1 to 10:1, more commonly at about 3:1 to 6:1. The entire amount of hydrocarbon solvent and wax precipitant may be added to the oil or wax feed before initiating cooling, or the solvent and precipitant may be added incrementally at various stages of the cooling cycle. Although the present invention will be described with respect to a process for dewaxing or deoiling with a solvent mixture of ketones and low boiling aromatic hydrocarbons, it is not limited thereto. The scope of the present invention includes the use of wax-precipitating solvents such as propane, ethylene dichloride and trichloroethylene for separation of the petroleum oil and wax.

It is generally known by those familiar with the art that no matter what combination of solvents, dilution ratio or scheme for incremental dilution is used, the efficiency of separation of wax and oil leaves much to be desired. Some of the wax is slow to precipitate from solution and may pass through the filter with the filtrate. Some of the wax, although precipitating from solution, does so in such finely divided states or as such highly solvated crystals, that the filtration rate is slow and considerable oil is retained with the crystal masses in spite of efforts to wash the oil through the wax cake with wash solvent. Likewise, if centrifugal force is used to separate the wax phase, efficiency of separation is impaired by the small mass and solvated structure of these wax crystals. These difficulties are most pronounced in the case of residual oils.

Residual oil is obtained from reduced crude and is that portion of petroleum remaining after the more volatile fractions, including neutral or distillate lubricating oils, are removed by topping and vacuum distillation. The micro-crystalline nature of resdual waxes has in the past hindered efficient separation of the o il and wax. This microcrystalline wax normally is slow to precipitate completely from an oil-solvent solution and upon precipitation forms such small crystals that the resulting filter cake has a creamy, sludge-like texture which restricts filtration rate and prevents efficient washing. As a result, dewaxing cost is high because of the slow processing rate and the loss of oil to the cake. Excessive oil in the cake, in turn, amplifies the difficulties of subsequently deoiling the crude wax for production of refined microcrystalline waxes.

It has now been discovered that substantial improvement in the efficiency of separating wax-petroleum oil mixtures, particularly such mixtures containing residual lubricating oils, can be obtained, in accordance with the present invention by the use as a dewaxing or deoiling aid of a combination of two distinctly different materials, polyethylene and wax alkylated naphthalene dispersed as a liquid in the oil-wax mixture. It has been found that the use of a combination of these aids gives better results and offers advantages over the use of either additive alone. Waxy petroleum oils can be dewaxed by the process of this invention by dissolving in the oil a dewaxing solvent and small amounts, sufficient to facilitate separation of oil and wax, of each of a normally solid polyethylene and a wax alkylated naphthalene, cooling the mixture thereby precipitating the wax, and separating the precipitated wax from the oil. Similarly improvement in the solvent deoiling of waxes can be obtained by the conjoint use of these aids. Also included in this invention are novel compositions comprising a dewaxing or deoiling solvent, and as dewaxing or deoiling aids, both a normally solid polyethylene and a wax alkylated naphthalene, the latter often with a kinematic viscosity at 210° F. of about 400–800 centistokes on an oil free basis. These agents are employed in amounts effective to aid the separation of the wax and oil.

The polyethylene used in this invention can be of a low or high molecular weight and of low or high density. However, the polymer must be a solid at room temperature rather than a liquid. A preferred type of polymer is a relatively low molecular weight, highly branched polyethylene. Such a material is relatively easy to disperse in the wax-oil mixture to be treated, and gives best results. The degree of branching of the preferred polymer is such that the specific gravity (sp. gr. 60/60) is about 0.880 to 0.910. It is interesting that low molecular weight atactic polypropylene is not suitable as a replacement for polyethylene in this invention.

The normally solid polyethylene suitable for the present invention can vary and is dispersible as a liquid in the mixture of oil and wax. These resins include, for instance, polyethylene polymers of about 1000 to 200,000 or 1,000,000 or more molecular weight, preferably about 1000 to 5000 molecular weight The addition of the combination of aids of this invention to wax-oil mixtures undergoing solvent treatment results in the following advantages: more rapid and complete wax precipitation, increased oil yield, greatly increased filtration rate, formation of easily filterable crystals reducing the tendency for formation of "after haze" or cloudiness in oil, and production of wax of lower oil content. In addition there is no sacrifice of pour point of the oil due to this process.

Suitable wax alkylated naphthalenes for use in this invention and their preparation are described in U.S. Pats. 2,339,493 and 2,174,246, herein incorporated by reference. The alkylated naphthalene can be a very viscous liquid, too viscous to handle easily at room temperature, so it is convenient to use it in the form of a blend with mineral oil. The alkylated naphthalenes used in the work described below were a solution of about 30–35 weight percent concentration in oil, purchased under the trade name, Paraflow Dewaxing Aid No. 1. This alkylated naphthalene has a KV of about 65–75 centistokes at 210° F. and is made from chlorinated paraffin wax.

By the method of the present invention a small amount of each of the polyethylene and wax alkylated naphthalenes sufficient to facilitate separation of oil and wax can be used. Such amounts are often at least about .01% by weight based on the oil plus wax. These amounts preferably include about .02% to .5% by weight, of the alkylated naphthalene, and preferably about 0.03–0.1% by weight of the polyethylene. The agents are added to the wax-oil mixture prior to solvent dewaxing or deoiling, i.e. prior to separation of the oil and wax. The aids can be incorporated by dissolving in a small portion of the solvent which can be heated to insure solution, or by heating the aids to about 210° F. in a small portion of the oil charge, and in either case before cooling adding the solution to the wax-oil mixture which can be at a temperature about 160° F., for instance, of oil-wax mixture with the combined aids of this invention, compared with the polyethylene and alkylated naphthalene used separately as aids, and with no dewaxing aid.

EXAMPLE I

One volume (1150 cc. or 1000 g.) of waxy residual lubricating oil from a Mid-Continent crude which had previously been deasphalted by propane treatment and phenol treated to remove aromatics, was blended with 4.3 volumes of dewaxing solvent. The solvent consisted of a 55:45 volume ratio of toluene and methylethyl ketone. The mixture was heated with stirring to 160° F., cooled with stirring over a period of 55 to 60 minutes to −5° F., and filtered through a single leaf vacuum filter by immersing the filter in the cold slurry. After a cake of wax built up, the filter leaf was transferred to a supply of wash solvent of the same composition as the dewaxing solvent, and also at −5° F., to wash excess oil from the cake. The amount of wash solvent used was 1.6±.3 volumes. After washing and drying, the cake was scraped into a receiver and the procedure repeated. Wax and dewaxed oil were recovered by distilling off the solvent from the cake and filtrate plus washings.

When a dewaxing aid or a combination of aids was used, the aid was prepared for addition by dissolving in about 50 cc. of the solvent by heating separately in a small glass beaker to ensure solution, or by heating separately to 210° F. in about 50 grams of the oil charge, and in either case, adding the solution before cooling to the main wax-oil solution while the latter was at a temperature of 160° F.

Using this procedure and conditions for dewaxing, a series of dewaxings were undertaken as shown in Table I. The dewaxing additives shown in Table I are polymer "A," a 1200 mol. wt. branched polyethylene of 0.882 sp. gr., marketed as AC–1702; polymer "D," a 4000 mol. wt. branched polyethylene of 0.902 sp. gr., marketed as DYDT; and agent "P," wax alkylated naphthalene blended with petroleum oil at an approximate 1:2 ratio marketed as Paraflow No. 1.

The advantage of the use of the combination dewaxing aid is apparent from the results in Table I. Of particular significance in Table I are the total times required to filter and wash in the various tests. It is of significance to note that as the filtration rate improved the yield of oil also improved because the loss of oil to the wax decreased. Even though a little less wash solvent was used in some of the faster filtrations, the cake was freer of oil. Further, the improvement in rate and increase in oil yield were obtained with no sacrifice in pour points. The range in pour points results of +10 to +15 merely represent the normal variation resulting from inaccuracies inherent in the test procedure.

The results in Table I show that faster rates (shorter time) can be achieved with a combination of polymer A and agent P or a combination of polymer D and agent P than by using either A, D, or P alone. Also, the degree of separation when using the combination of additives is as high or higher than when using a single additive type. It is also advantageous to minimize the use of the alkylated naphthalene as it is much more expensive than polymers "A" or "D" or other common polyethylenes which can be employed in this invention.

4. The process of claim 3 wherein said petroleum oil is a residual lubricating oil.

5. The process of claim 4 wherein said polyethylene has a density of about 0.880 to 0.910.

6. The process of claim 4 wherein the solvent is a mixture of toluene and methylethyl ketone.

7. The process of claim 6 wherein the kinematic viscosity of the wax alkylated naphthalene is about 400 to 800 centistokes at 210° F.

8. The process of claim 6 wherein the waxy petroleum oil is dewaxed.

9. The process of claim 8 wherein said polyethylene has a density of about 0.880 to 0.910.

TABLE I

| Dewaxing Test No. | Dewaxing* Additive | Vacuum, in. Hg. | Vol. of Wash, cc. | Oil Yield, Wt. percent | Oil Pour Point | Percent Oil in wax | Filter and Wash Time, min. |
|---|---|---|---|---|---|---|---|
| 1,059 | 0 | 28 | 1,900 | 70.7 | +10 | 6.7 | 62 |
| 1,061 | 0 | 28 | 2,200 | 70.5 | +15 | 6.2 | 67 |
| 1,053 | .05% Polymer "A" | 23 | 1,900 | 72.8 | | | 34 |
| 1,058 | .075% Polymer "A" | 27 | 1,700 | 73.6 | +10 | 4.7 | 30 |
| 1,066 | .10% Polymer "A" | 26 | 1,700 | 73.4 | | 4.8 | 35 |
| 1,068 | .20% Polymer "A" | 25 | 1,600 | 73.4 | +15 | 5.5 | 32 |
| 1,035 | .02% Polymer "D" | 28 | 2,200 | 74.7 | +15 | 4.0 | 43 |
| 1,034 | .05% Polymer "D" | 28 | 2,200 | 74.6 | +15 | 4.0 | 26 |
| 1,036 | .2% Polymer "D" | 26 | 2,200 | 75.7 | +15 | 2.9 | 28 |
| 1,064 | .15% Polymer "P" | 26 | 1,700 | 73.1 | | 5.3 | 57 |
| 1,062 | .25% Polymer "P" | 27 | 1,700 | 75.9 | +10 | 2.5 | 35 |
| 1,063 | .50% Polymer "P" | 26 | 1,500 | 75.2 | +10 | 2.7 | 24 |
| 1,065 | .05% "A" plus .15% "P" | 25 | 1,700 | 75.0 | +15 | 3.4 | 29 |
| 1,060 | .05% "A" plus .20% "P" | 27 | 1,600 | 96.5 | +10 | 2.5 | 19 |
| 1,069 | .05% "D" plus .20% "P" | 26 | 1,500 | 75.8 | +15 | 2.5 | 18 |

* Based on weight percent by weight of waxy oil.

It is claimed:

1. In a solvent treating process for separating wax-petroleum oil mixtures through treatment with a wax-precipitating solvent, the improvement which comprises providing as a dispersed liquid in a mixture of the wax precipitating solvent, wax and petroleum oil, small amounts, sufficient to facilitate separation of the oil and wax, of each of a normally solid polyethylene and a wax alkylated naphthalene, wherein the amount of polyethylene is about 0.03 to 0.1% by weight and the amount of wax alkylated naphthalene is about 0.02 to 0.5% by weight, based on the wax and petroleum oil.

2. The process of claim 1 wherein said petroleum oil is a residual lubricating oil.

3. The process of claim 1 wherein the solvent is a mixture of ketone and hydrocarbon more volatile than said oil.

10. The process of claim 9 wherein the kinematic viscosity of the wax alkylated naphthalene is about 400 to 800 centistokes at 210° F.

References Cited

UNITED STATES PATENTS

| 2,782,142 | 2/1957 | De Vault | 208—33 |
| 3,329,602 | 7/1967 | Moyer | 208—33 |
| 3,355,379 | 11/1967 | Leonard | 208—33 |
| 3,417,010 | 12/1968 | Henselman et al. | 208—33 |
| 3,458,430 | 7/1969 | Henselman et al. | 208—33 |

HERBERT LEVINE, Primary Examiner

U.S. Cl. X.R.

208—31